(12) United States Patent
Tu et al.

(10) Patent No.: US 9,780,629 B2
(45) Date of Patent: Oct. 3, 2017

(54) METHOD FOR MANUFACTURING MAGNET-CONDUCTIVE DEVICE AND GLUE-INJECTABLE PUNCH STRUCTURE THEREOF

(71) Applicant: METAL INDUSTRIES RESEARCH & DEVELOPMENT CENTRE, Kaohsiung (TW)

(72) Inventors: Kuo-Yin Tu, Kaohsiung (TW); Hsing-Chih Tsai, Kaohsiung (TW); Hsin-Te Wang, Kaohsiung (TW); Yi-Wei Sun, Kaohsiung (TW)

(73) Assignee: METAL INDUSTRIES RESEARCH & DEVELOPMENT CENTRE, Kaohsiung (TW)

( * ) Notice: Subject to any disclaimer, the term of this patent is extended or adjusted under 35 U.S.C. 154(b) by 672 days.

(21) Appl. No.: 14/200,174

(22) Filed: Mar. 7, 2014

(65) Prior Publication Data
US 2014/0284837 A1    Sep. 25, 2014

(30) Foreign Application Priority Data

Mar. 21, 2013   (TW) .............................. 102110133 A (51) Int. Cl.
*B29C 65/72* (2006.01)
*H02K 15/02* (2006.01)

(52) U.S. Cl.
CPC ......... *H02K 15/02* (2013.01); *H02K 2201/09* (2013.01)

(58) Field of Classification Search
CPC ............ B29C 65/72; B29C 2043/3615; B29C 2045/2886; B29C 45/2806; H02K 15/02; H02K 2201/09; B21J 15/025

USPC .......................................... 264/154; 425/564
See application file for complete search history.

(56) References Cited

U.S. PATENT DOCUMENTS 6,464,909 B1 * 10/2002 Kazmer .............. B29C 45/2806
                                                            264/328.8
6,543,115 B1 *  4/2003 Mauer .................... B21J 15/025
                                                             29/407.01

FOREIGN PATENT DOCUMENTS

DE            EP 1270113 A1 *  1/2003  ............ B21J 15/025

* cited by examiner

*Primary Examiner* — Alison L Hindenlang
*Assistant Examiner* — Mohamed K Ahmed Ali
(74) *Attorney, Agent, or Firm* — Jackson IPG PLLC; Damian K. Jackson (57) ABSTRACT

A method for manufacturing a magnet-conductive device includes performing a punch process to a plate by a glue-injectable punch structure, wherein the glue-injectable punch structure includes a punch head and a control member. The punch head comprises an accommodating cavity, an injection hole and an inlet, and a supply channel is formed by the accommodating cavity, the injection hole and the inlet. The control member selectively obstructs the supply channel or permits the supply channel into conduction. By using the method for manufacturing the magnet-conductive device, the stack between plural plates is simplified, and the coupling strength between adjacent plates is enhanced. In addition, this invention considers the gel between adjacent plates to be insulating medium to lower the iron loss of the magnet-conductive plates.

3 Claims, 8 Drawing Sheets

METHOD FOR MANUFACTURING MAGNET-CONDUCTIVE DEVICE AND GLUE-INJECTABLE PUNCH STRUCTURE THEREOF

FIELD OF THE INVENTION

The present invention generally relates to a method for manufacturing a magnet-conductive device, particularly relates the method in performing a punch process to a plate by using a glue-injectable punch structure and injecting a gel to the plate at the moment the action of the punch is performing.

BACKGROUND OF THE INVENTION

A conventional method for manufacturing a conventional motor stator is described as below. Punching plural silicon steel plates to form plural I-shaped plates; stacking all the I-shaped plates to form plural sets of I-shaped bars and adhering each set of the I-shaped bars with a gel; winding plural coils at each set of the I-shaped bars; arranging the I-shaped bars into a circular shape; eventually coating peripheral of each set of the I-shaped bars with a glue to fix the I-shaped bars therefore forming a stator. However, the process for manufacturing conventional motor stator is relatively complicated. Besides, the gel merely coats outer surface of each of the I-shaped plates, which exhibits an incomplete adherent state between adjacent I-shaped plates. Therefore, a gap is formed between adjacent I-shaped plates. When the stator of a motor is in operation, a wind shear phenomenon is occurred to result in vibrations and sounds of wind shear. Additionally, conventional motor stator likely generates iron loss, burr eddy-current loss and short issues.

SUMMARY

The primary object of the present invention is to provide a method for manufacturing a magnet-conductive device, wherein the method includes punching a plate by using a glue-injectable punch structure in a punch process and injecting a gel onto an upper surface of the plate via the glue-injectable punch structure at the moment the punch action is performed. Thus, when the next punching process is performed, another plate enables to engage with mentioned plate via compression force of the glue-injectable punch structure to increase the coupling strength between adjacent plates. In addition, the gel is an insulating medium for lowering iron loss and burr eddy-current loss, and the short issue is effectively inhibited. When the magnet-conductive device of the present invention is applicable to a motor, a wind shear phenomenon is not occurred to avoid vibrations and sounds of wind shear as long as the motor is under operation owing to the gap between adjacent plates filled with the gel.

Another object of the present invention is to provide a glue-injectable punch structure. In the punching process, the glue-injectable punch structure enables to coat a gel onto the plate instantaneously.

A glue-injectable punch structure of the present invention includes a punch head and a control member, the punch head comprises an accommodating cavity, an injection hole and an inlet, wherein a supply channel is formed by the accommodating cavity, the injection hole and the inlet, the control member comprises a plug portion and a contact portion connected to the plug portion, the plug portion is disposed at the accommodating cavity, the contact portion is movably disposed at the inlet, and the control member selectively obstructs the supply channel or permits the supply channel into conduction. In this invention, when the punching process is performed by using the punch head, the control member allows the supply channel into conduction and makes the gel filled with the supply channel. When the punch head finishes punching and restores to its original position, the control member obstructs the supply channel and pushes the gel filled with the supply channel via the plug portion of the control member for making the gel injected instantaneously onto the filling area of the compression portion through the supply channel.

The present invention simplifies the process for stacking plural plates and adhere adjacent plates from each other by compression force of punching and injected glue to increase the coupling strength between adjacent plates. The gel of the present invention belongs to an insulating medium, which may lower the iron loss and burr eddy-current loss of stacked magnet-conductive plates, and the short issue is effectively inhibited.

DETAILED DESCRIPTION OF THE INVENTION

Figure 1:
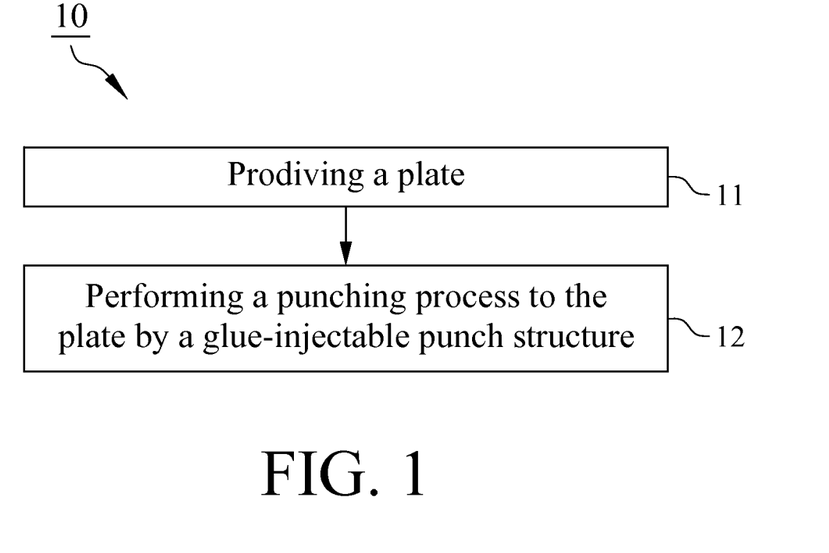
FIG. 1 is a flow chart illustrating a method for manufacturing a magnet-conductive device in accordance with an embodiment of the present invention.

With reference to FIG. 1, a method 10 for manufacturing a magnet-conductive device includes the step 11 of providing a plate and another step 12 of performing a punching process to the plate by using a glue-injectable punch structure.

Figure 2:
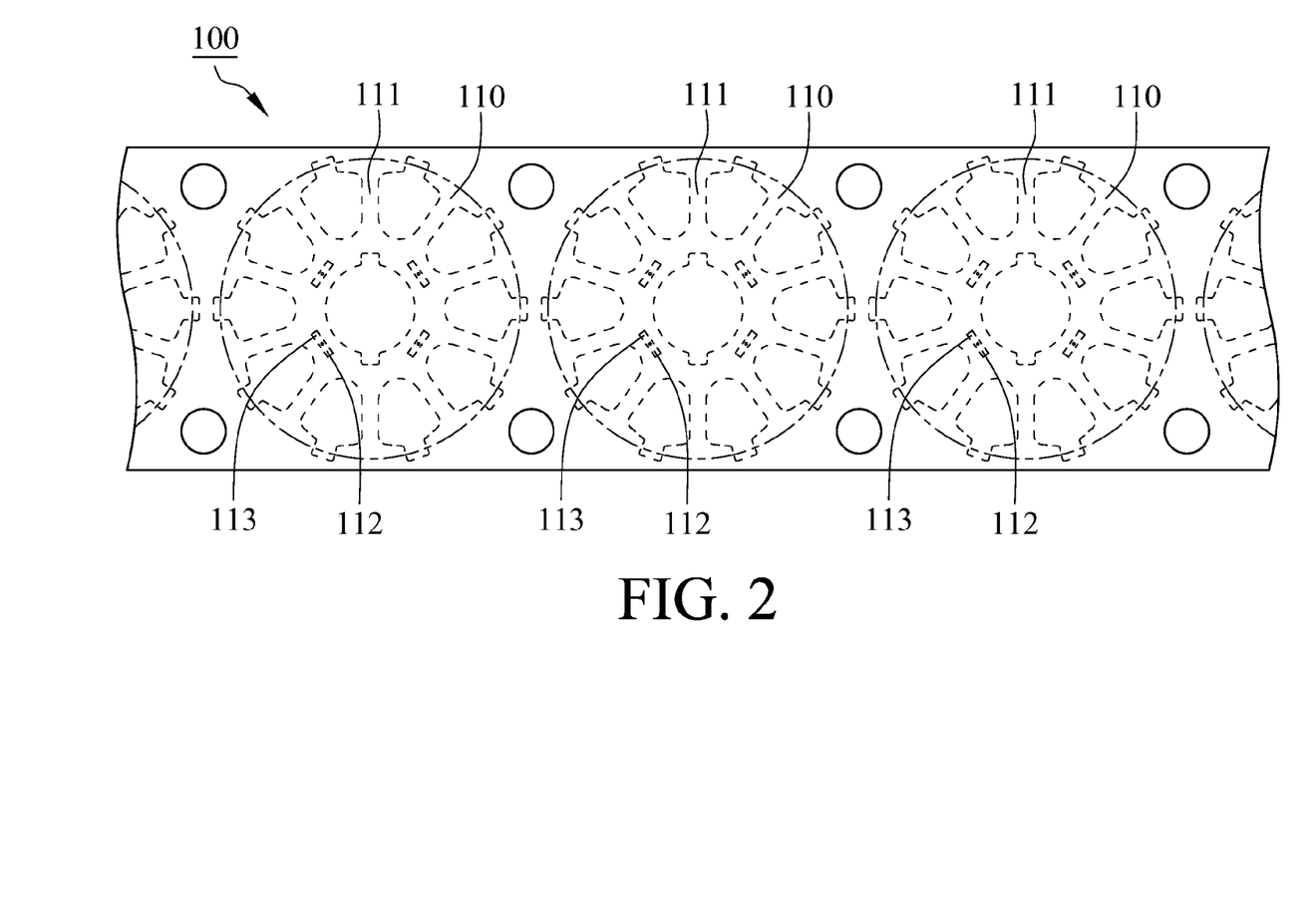
FIG. 2 is a top view illustrating a plate in accordance with the embodiment of the present invention.
Figure 3:
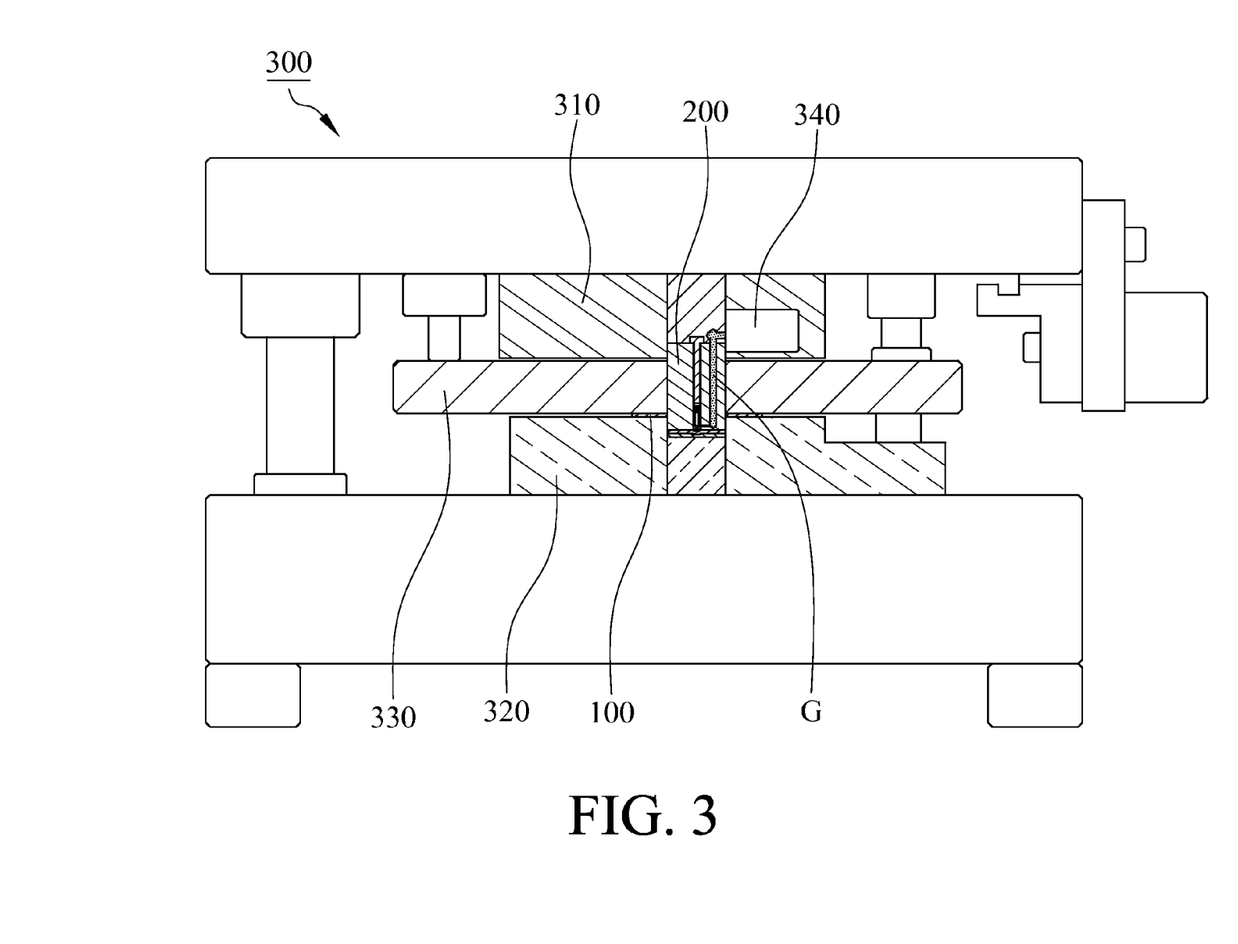
FIG. 3 is a schematic diagram illustrating a punch module and a glue-injectable punch structure in accordance with the embodiment of the present invention.

Referring to FIGS. 1 and 2, in the step 11 of providing a plate, the plate 100 comprises a plurality of compression portions 110, each of the compression portions 110 comprises a surface 111 having a riveting area 112 and a filling area 113, in this embodiment, the filling area 113 is located on the riveting area 112. With reference to FIGS. 1 and 3, in the step 12 of performing a punching process to the plate by using a glue-injectable punch structure, the glue-injectable punch structure 200 is engaged with a punching module 300 to perform the punching process, wherein the punching module 300 comprises an upper mold 310, a lower mold 320, a pressing plate 330 and a supplying apparatus 340. The glue-injectable punch structure 200 is mounted at the upper mold 310, the pressing plate 330 and the lower mold 320 are used for fixing the plate 100, and the supplying apparatus 340 provides the glue-injectable punch structure 200 with a gel G.

Figure 4:
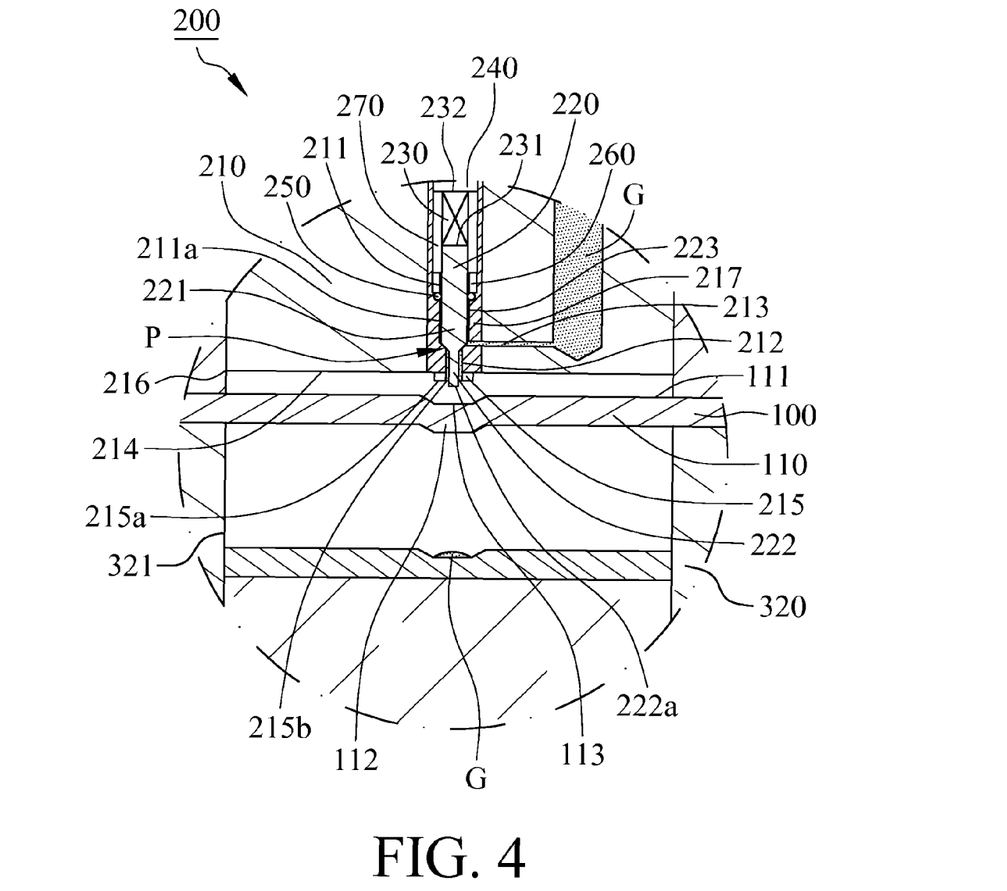
FIG. 4 is a schematic diagram illustrating the plate punched by the glue-injected punch structure in accordance with the embodiment of the present invention.
Figure 5:
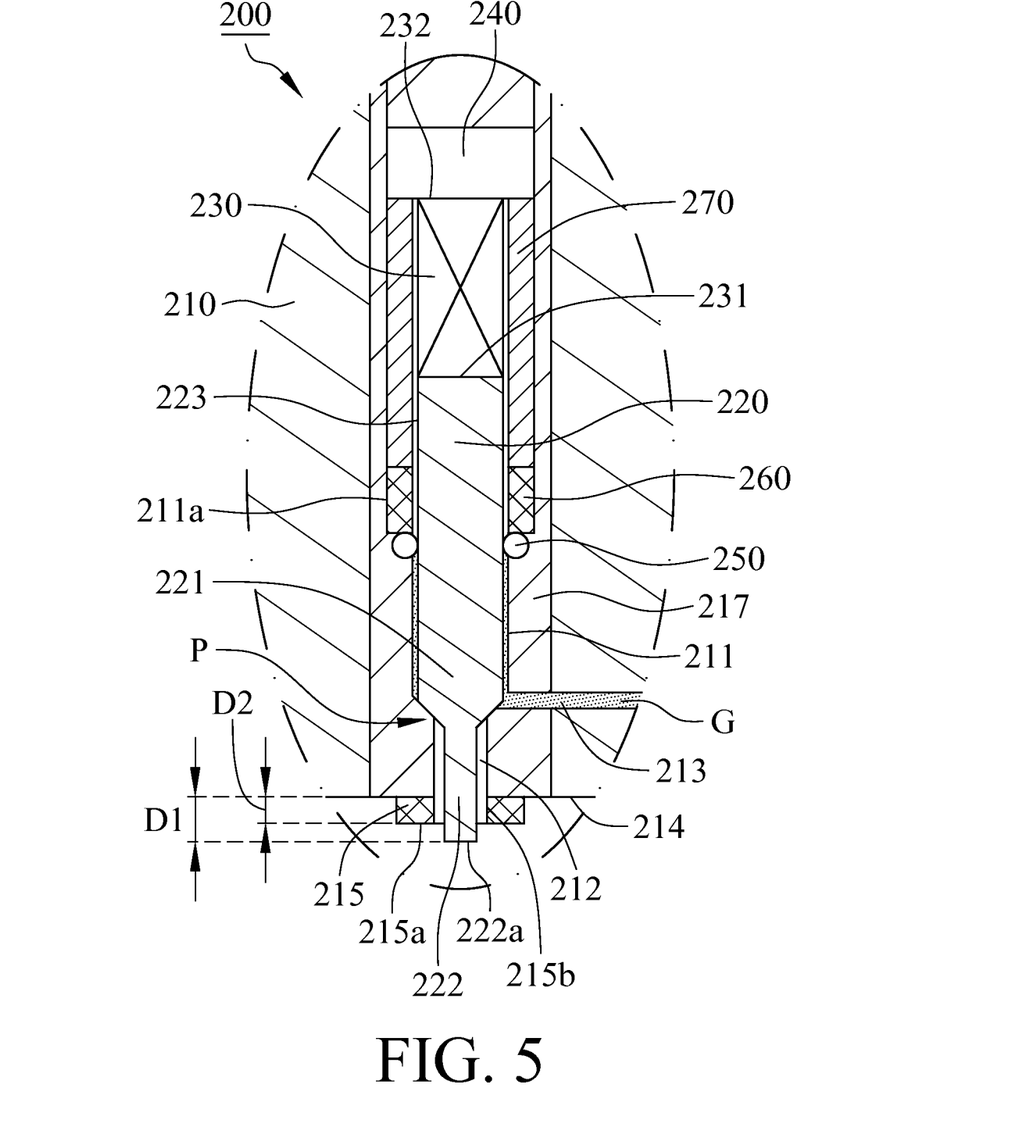
FIG. 5 is a partial enlargement diagram illustrating the glue-injectable punch structure in accordance with the embodiment of the present invention.

With reference to FIGS. 4 and 5, the glue-injectable punch structure 200 includes a punch head 210, a control member 220, an elastic member 230, a blocking member 240, a seal ring 250, a fixing member 260 and a protective sheath 270, wherein the punch head 210 comprises an accommodating cavity 211, an injection hole 212, an inlet 213, a surface 214, a riveting protrusion 215, a cutting portion 216 and a sleeve 217. When the punching process 12 is performing, the cutting portion 216 corresponds to a mold cavity 321 of the lower mold 320 to make each of the compression portions 110 separate apart from the plate 100 in sequence. The injection hole 212 is recessed to the surface 214, and the injection hole 212 and the inlet 213 are communicated with the accommodating cavity 211 so that a supply channel P is formed by the accommodating cavity 211, the injection hole 212 and the inlet 213. The riveting protrusion 215 comprises a sustaining surface 215a and an outlet 215b communicated with the injection hole 212, and the accommodating cavity 211 is surrounded by the sleeve 217 to make the control member 220 convenient to be mounted within the glue-injectable punch structure 200. Or in another embodiment, the sleeve 217 is no longer needed.

With reference to FIGS. 4 and 5, the control member 220 comprises a plug portion 221, a contact portion 222 and an outer lateral wall 223, wherein the plug portion 221 is disposed at the accommodating cavity 211 and connects to the contact portion 222, the contact portion 222 is movably disposed at the injection hole 212 and comprises a contact surface 222a. Referring to FIG. 5, a first interval D1 is formed between the contact surface 222a and the surface 214, a second interval D2 is formed between the sustaining surface 215a and the surface 214, the second interval D2 is equal to the depth of the riveting area 112, and the first interval D1 is larger than the second interval D2 (the depth of the riveting area 112). Therefore, when the punch process is performing by using the glue-injectable punch structure 200, the contact surface 222a of the contact portion 222 contacts against the plate 100 so as to make the control member 220 retract upwardly therefore permitting the supply channel P into conduction. After performing the punch process and the riveting process, the contact surface 222a of the contact portion 222 no longer contacts with the plate 100 so that the control member 220 extends downwardly to obstruct the supply channel P.

With reference to FIG. 5, the elastic member 230 and the blocking member 240 are disposed at the accommodating cavity 211, the elastic member 230 comprises a first end portion 231 and a second end portion 232, the first end portion 231 contacts against the control member 220, the second end portion 232 contacts against the blocking member 240, and the elastic member 230 is located between the blocking member 240 and the control member 220. The accommodating cavity 211 comprises an inner lateral wall 211a, the seal ring 250 contacts against the outer lateral wall 223 of the control member 220 and the inner lateral wall 211a of the accommodating cavity 211 to inhibit the gel G from adhering to the elastic member 230 therefore influencing the elasticity of the elastic member 230. The fixing member 260 is disposed at the accommodating cavity 211 for fixing the seal ring 250. In this embodiment, the fixing member 260 is securely fixed at the accommodating cavity 211 via an external thread, and the protective sheath 270 is disposed between the outer lateral wall 223 and the inner lateral wall 211a to prevent the friction between the control member 220 and the accommodating cavity 211 from happened to avoid damage while the punch process is performing.

Figure 6:
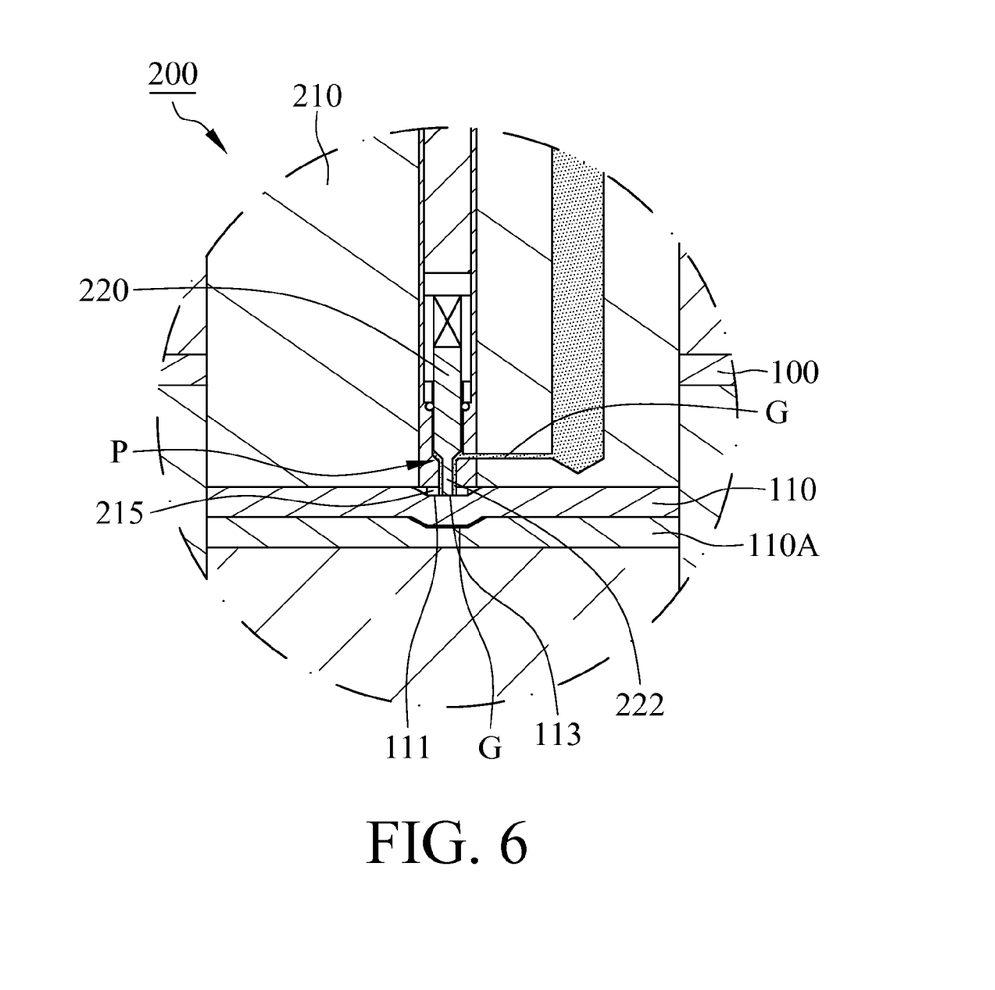
FIG. 6 is a schematic diagram illustrating the plate punched by the glue-injected punch structure in accordance with the embodiment of the present invention.
Figure 7:
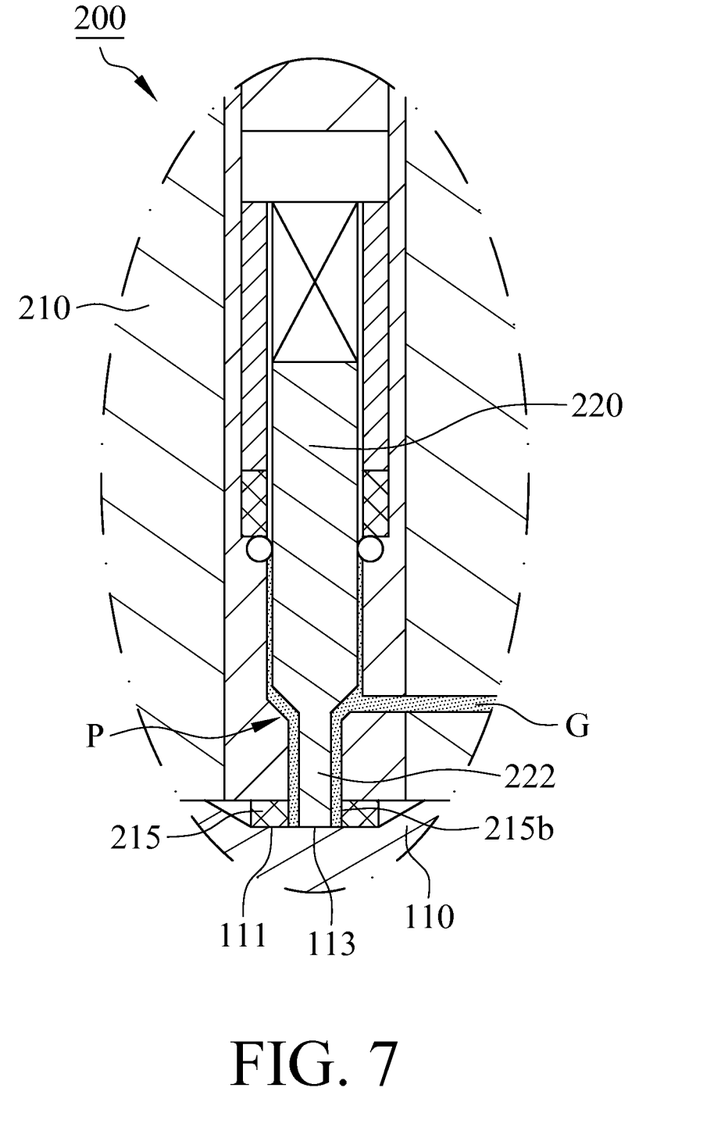
FIG. 7 is a partial enlargement diagram illustrating the glue-injectable punch structure in accordance with the embodiment of the present invention.
Figure 8:
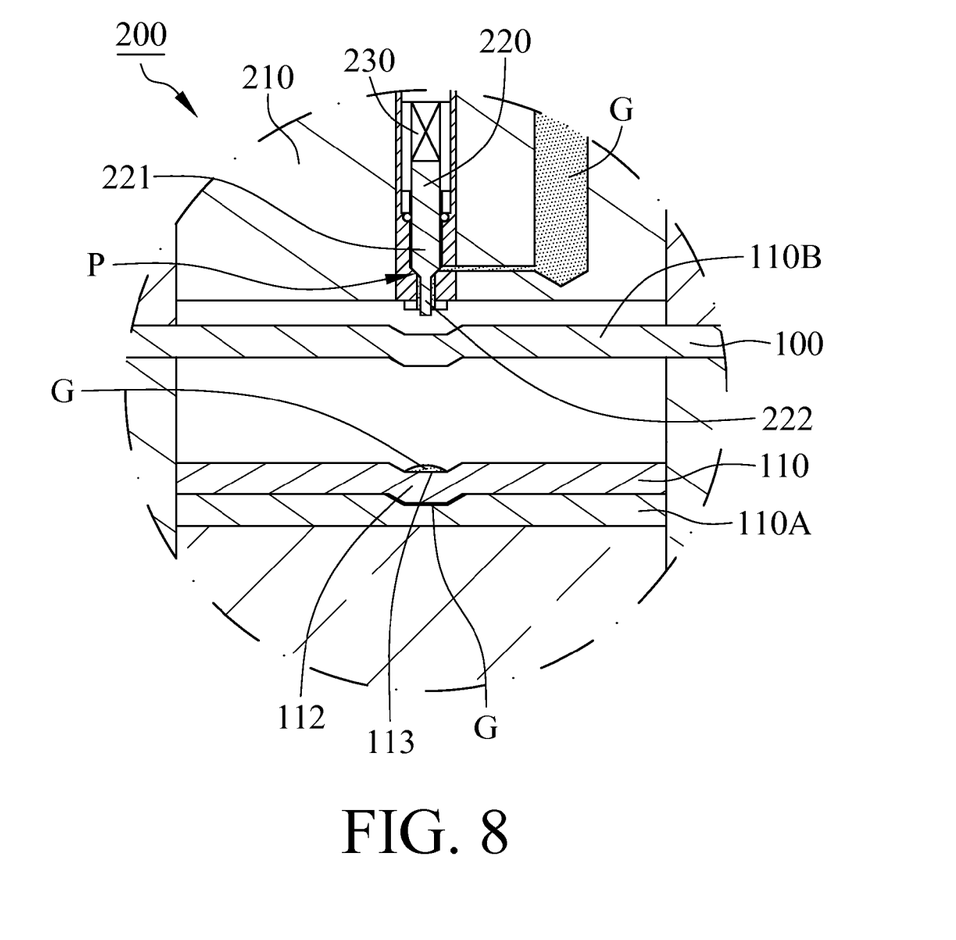
FIG. 8 is a schematic diagram illustrating the plate punched by the glue-injected punch structure in accordance with the embodiment of the present invention.

With reference to FIGS. 6 and 7, when the punch head 210 punches the compression portion 110 of the plate 110, the riveting protrusion 215 of the punch head 210 contacts against the riveting area 112 of the compression portion 110 to make the compression portion 110 riveted and adhered to another compression portion 110A simultaneously. The contact portion 222 of the control member 220 contacts against the surface 111 of the plate 100 and forces the control member 220 to compress the elastic member 230, which enables the control member 220 to permit the supply channel P into conduction. Due to conduction state of the supply channel P, the supply channel P is filled with the gel G. With reference to FIG. 8, when the punch process by using the glue-injectable punch structure 200 is finished, the elastic member 230 pushes the control member 220 via a restoration force. Thereafter, the plug portion 221 of the control member 220 pushes the gel G to make the gel G flow through the supply channel P, flow out of the outlet 215b of the riveting protrusion 215, and stick to the filling area 113 of the plate 100. When the next punch process is performed by using the glue-injectable punch structure 200, the compression portion 110B enables to rivet and adhere to the compression portion 110 simultaneously while the action of punching the compression portion 110B is performed.

In this invention, when the punching process is performed by using the punch head 210, the control member 220 allows the supply channel P into conduction and makes the gel G filled with the supply channel P. When the punch head 210 finishes punching and restores to its original position, the control member 220 obstructs the supply channel P and pushes the gel filled with the supply channel P via the plug portion 221 of the control member 220 for making the gel G injected instantaneously onto the filling area 113 of the compression portion 110 through the supply channel P.

In this invention, when the plate is punched by the punch process, the gel is injected onto the plate simultaneously to reduce the processes and raise the flexibility of process arrangements.

The present invention simplifies the process for stacking plural plates, adheres adjacent plates from each other by the force of punching and injected glue to increase the coupling strength between adjacent plates. The gel of the present invention belongs to an insulating medium, which may lower the iron loss and burr eddy-current loss of stacked magnet-conductive plates, and the short issue is effectively inhibited.

While this invention has been particularly illustrated and described in detail with respect to the preferred embodiments thereof, it will be clearly understood by those skilled in the art that it is not limited to the specific features and describes and various modifications and changes in form and details may be made without departing from the spirit and scope of this invention.

What is claimed is:

1. A glue-injectable punch structure includes:
   a punch head for punching a plate having an accommodating cavity, an injection hole, and an inlet, wherein a supply channel is formed by the accommodating cavity, the injection hole and the inlet; and
   a control member having a plug portion and a contact portion connected to the plug portion, the plug portion is disposed at the accommodating cavity, the contact portion is movably disposed at the injection hole, and the control member selectively obstructs the supply channel or permits the supply channel into conduction, wherein the punch head further comprises a surface, the inlet is recessed to the surface, and the contact portion of the control member protrudes from the surface, wherein the punch head further comprises a riveting protrusion disposed at the surface of the punch head, the riveting protrusion comprises a touching surface and an outlet communicated with the injection hole, the contact portion of the control member comprises a contact surface, wherein a first interval is formed between the contact surface and the surface, a second interval is formed between the touching surface and the surface, and the first interval is larger than the second interval.

2. The glue-injectable punch structure in accordance with claim 1 further includes an elastic member and a blocking member, the elastic member is disposed at the accommodating cavity and contacts against the control member, the blocking member is disposed at the accommodating cavity, and the elastic member comprises a first end portion and a second end portion, the first end portion contacts against the control member, the second end portion contacts against the blocking member, and the elastic member is located between the blocking member and the control member.

3. The glue-injectable punch structure in accordance with claim 1 further includes a seal ring, the control member comprises an outer lateral wall, the accommodating cavity comprises an inner lateral wall, and the seal ring contacts against the outer lateral wall and the inner lateral wall.

* * * * *